United States Patent
Tang

(10) Patent No.: US 11,218,256 B2
(45) Date of Patent: Jan. 4, 2022

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 97 days.

(21) Appl. No.: 16/619,204

(22) PCT Filed: Jul. 27, 2017

(86) PCT No.: PCT/CN2017/094763
§ 371 (c)(1),
(2) Date: Dec. 4, 2019

(87) PCT Pub. No.: WO2019/019120
PCT Pub. Date: Jan. 31, 2019

(65) Prior Publication Data
US 2020/0177316 A1    Jun. 4, 2020

(51) Int. Cl.
  *H04L 1/18*     (2006.01)
  *H04W 76/19*    (2018.01)
  (Continued)

(52) U.S. Cl.
  CPC .......... *H04L 1/1816* (2013.01); *H04W 76/19* (2018.02); *H04W 76/27* (2018.02); *H04W 80/02* (2013.01); *H04W 80/08* (2013.01); *H04W 84/20* (2013.01)

(58) Field of Classification Search
None
See application file for complete search history.

(56) References Cited

U.S. PATENT DOCUMENTS

2011/0242970 A1   10/2011  Prakash et al.
2015/0373754 A1   12/2015  Wu
(Continued)

FOREIGN PATENT DOCUMENTS

| CN | 103581941 | 2/2014 |
| CN | 105101253 | 11/2015 |
| CN | 106134261 | 11/2016 |

OTHER PUBLICATIONS

R2-1707340 "Reaching maximum number of RLC retransmission with PDCP duplication" LG 3GPP TSG-RAN WG2 NR Ad Hoc #Jun. 27-29, 2017. (Year: 2017).*
(Continued)

*Primary Examiner* — Jeffrey M Rutkowski
*Assistant Examiner* — Basil Ma
(74) *Attorney, Agent, or Firm* — Hodgson Russ LLP

(57) ABSTRACT

A data transmission method includes: when the number of retransmission times of a protocol data unit (PDU) of a radio link control (RLC) layer is greater than or equal to a maximum number of retransmission times, and a radio link fault (RLF) is triggered, determining the type of a cell group corresponding to the PDU, wherein the cell group corresponding to the PDU includes a first-type cell group and/or a second-type cell group, and the type of the first-type cell group is different from the type of the second-type cell group; and processing the RLF according to the type of the cell group corresponding to the PDU.

8 Claims, 2 Drawing Sheets

(51) Int. Cl.
*H04W 76/27* (2018.01)
*H04W 80/02* (2009.01)
*H04W 80/08* (2009.01)
*H04W 84/20* (2009.01)

(56) References Cited

U.S. PATENT DOCUMENTS

| | | | |
|---|---|---|---|
| 2016/0037579 A1* | 2/2016 | Jung | H04W 76/34 370/252 |
| 2016/0192269 A1* | 6/2016 | Kim | H04W 36/00837 370/332 |
| 2018/0367288 A1* | 12/2018 | Vrzic | H04W 36/0069 |
| 2020/0092939 A1* | 3/2020 | Kim | H04W 76/30 |
| 2020/0127886 A1* | 4/2020 | Tang | H04L 41/0668 |
| 2021/0007035 A1* | 1/2021 | Tang | H04W 24/08 |

OTHER PUBLICATIONS

IPI, Office Action for IN Application No. 201917050622, dated Jan. 29, 2021.
WIPO, ISR for PCT/CN2017/094763, dated Mar. 28, 2018.
3GPP TS 36.331 V14.3.0: "3rd Generation Partnership Project; Technical Specification Group Radio Access Network Evolved Universal Terrestrial Radio Access (E-UTRA); Radio Resouice Control (RRC); Protocol specification (Release 14)," Jun. 2017, 745 pages.
Nokia et al., "Duplication Impacts to RLC," 3GPP TSG-RAN WG2 NR Adhoc #2, R2-1706549, Jun. 2017, 2 pages.
LG Electronics Inc., "Reaching maximum No. of RLC retransmission with PDCP duplication," 3GPP TSG-RAN WG2 NR Ad Hoc #2, R2-1707340, Jun. 2017, 2 pages.
Intel Corporation, "Details on S-RLF," 3GPP TSG-RAN WG2 #87, R2-143186, Aug. 2014, 3 pages.
CATT, "RLC failure and RLF," 3GPP TSG-RAN WG2 Meeting #NR AH2, R2-1706394 (revision of R2-1704226), Jun. 2017, 4 pages.
3GPP TS 36.322 V14.0.0: "3rd Generation Partnership Project; Technical Specification Group Radio Access Network Evolved Universal Terrestrial Radio Access (E-UTRA); Radio Link Control (RLC) protocol specification (Release 14)," Mar. 2017, 45 pages.
EPO, Office Action for EP Application No. 17919164.8, dated Mar. 19, 2020.

* cited by examiner

DATA TRANSMISSION METHOD, TERMINAL DEVICE AND NETWORK DEVICE

CROSS-REFERENCE TO RELATED APPLICATION

This application is a U.S. national phase application of International Application No. PCT/CN2017/094763, filed Jul. 27, 2017, the entire disclosure of which is incorporated herein by reference.

TECHNICAL FIELD

Embodiments of the present disclosure relate to the field of communication, and more particularly, to a data transmission method, a terminal device, and a network device.

BACKGROUND

Belonging to a data link layer, the Radio Link Control (RLC) layer is used for providing segmentation and retransmission services for users and control data. Specifically, functions of the RLC layer is implemented by RLC entities. An RLC entity may be configured in any one of the following three modes: Transparent Mode (TM), Unacknowledged Mode (UM), and Acknowledged Mode (AM). The AM mode provides all RLC functions, and can effectively improve the reliability of data transmission through error detection and retransmission.

In the Long Term Evolution (LTE) technologies, user equipment (UE) may trigger a radio link failure (RLF) for the maximum number of retransmissions that occurs on the RLC layer of a master cell group (MCG) and the RLC layer of a secondary cell group (SCG). When processing the RLF, if the cell group is the MCG, an RRC connection release or an RRC connection re-establishment may occur. However, if the cell group is the SCG, all SCG transmissions may be pended (i.e., cached in a buffer).

It can be found that the existing technical solutions may have an uplink data transmission failure and thus reduce the success rate of data transmission. For example, when configuration data (DRB) or signaling (SRB) is only transmitted in the SCG, the uplink transmission failure may be caused by fault of the SCG.

SUMMARY

A data transmission method, a terminal device and a network device are provided, which can effectively improve the success rate of data transmission.

A first aspect provides a data transmission method, which includes:

determining, when the number of retransmission times of a protocol data unit (PDU) of a radio link control (RLC) layer is greater than or equal to a maximum number of retransmission times and a radio link fault (RLF) is triggered, a type of a cell group corresponding to the PDU, the cell group corresponding to the PDU including a first-type cell group and/or a second-type cell group, and the type of the first-type cell group being different from the type of the second-type cell group; and processing the RLF according to the type of the cell group corresponding to the PDU.

According to the data transmission method of the embodiments of the present disclosure, with regard to a DC scenario, when the number of retransmission times of a PDU of an RLC layer is greater than or equal to a maximum number of retransmission times, and a radio link fault (RLF) is triggered, a terminal device triggers different RLF operations through a transmission scenario of the PDU, thereby being able to effectively improve the success rate of transmitting uplink data.

In some possible implementation manners, when the number of retransmission times of the PDU is greater than or equal to the maximum number of retransmission times and the RLF is triggered, a data duplication function of a packet data convergence protocol (PDCP) layer is in an activated state.

In some possible implementation manners, the processing the RLF according to the type of the cell group corresponding to the PDU includes:

reconfiguring a radio resource control (RRC) connection of the first-type cell group if the cell group corresponding to the PDU is the first-type cell group.

In some possible implementation manners, the reconfiguring a radio resource control (RRC) connection of the first-type cell group if the cell group corresponding to the PDU is the first-type cell group includes:

pending a signaling radio bearer (SRB) of the first-type cell group, and restoring an SRB of the second-type cell group; and sending, on the SRB of the second-type cell group, RRC reconfiguration information of the first-type cell group to the network device.

In some embodiments of the present disclosure, the terminal device sends, on the SRB of the second-type cell group, the RRC reconfiguration information of the first-type cell group to the network device, which can effectively improve the success rate of transmitting uplink data.

In some possible implementation manners, when the number of retransmission times of the PDU is greater than or equal to the maximum number of retransmission times and the RLF is triggered, a data duplication function of a packet data convergence protocol (PDCP) layer is in an inactivated state.

In some possible implementation manners, the processing the RLF according to the type of the cell group corresponding to the PDU includes:

pending a data radio bearer (DRB) of the first-type cell group and restoring a DRB of the second-type cell group if the cell group corresponding to the PDU is the first-type cell group; and sending the PDU to a network device on the DRB of the second-type cell group.

In some embodiments of the present disclosure, the terminal device sends the PDU to a network device on the DRB of the second-type cell group, which can effectively improve the success rate of transmitting uplink data.

In some possible implementation manners, the method further includes:

reconfiguring a radio resource control (RRC) connection of the first-type cell group.

In some possible implementation manners, the reconfiguring a radio resource control (RRC) connection of the first-type cell group includes:

pending a signaling radio bearer (SRB) of the first-type cell group, and restoring an SRB of the second-type cell group; and sending, on the SRB of the second-type cell group, RRC reconfiguration information of the first-type cell group to the network device.

In some possible implementation manners, the processing the RLF according to the type of the cell group corresponding to the PDU includes:

releasing or re-establishing a radio resource control (RRC) connection of the second-type cell group if the cell group corresponding to the PDU is the second-type cell group.

In some possible implementation manners, the first-type cell group is a secondary cell group (SCG), and the second-type cell group is a master cell group (MCG).

In some possible implementation manners, before the determining a type of a cell group corresponding to the PDU, the method further includes:

receiving configuration information sent by a network device, the configuration information being used for determining, by a terminal device, the type of the cell group corresponding to the PDU, wherein the determining a type of a cell group corresponding to the PDU includes:

determining the type of the cell group corresponding to the PDU according to the configuration information.

In some possible implementation manners, the receiving configuration information sent by a network device includes:

receiving a radio resource control (RRC) signaling sent by the network device, the RRC signaling including the configuration information.

A second aspect provides a data transmission method, which includes:

generating configuration information, the configuration information being used for determining, by a terminal device, a type of a cell group corresponding to a protocol data unit (PDU), such that the terminal device processes a radio link fault (RLF) according to the type of the cell group corresponding to the PDU when the number of retransmission times of the PDU is greater than or equal to the maximum number of retransmission times and the RLF is triggered, wherein the cell group corresponding to the PDU includes a first-type cell group and a second-type cell group, and the type of the first-type cell group is different from the type of the second-type cell group; and sending the configuration information to the terminal device.

In some possible implementation manners, the sending the configuration information to the terminal device includes:

sending a radio resource control (RRC) signaling to the terminal device, the RRC signaling including the configuration information.

A third aspect provides a terminal device, which includes:

a determining unit, configured to determine, when the number of retransmission times of a protocol data unit (PDU) of a radio link control (RLC) layer is greater than or equal to a maximum number of retransmission times and a radio link fault (RLF) is triggered, a type of a cell group corresponding to the PDU, the cell group corresponding to the PDU including a first-type cell group and/or a second-type cell group, and the type of the first-type cell group being different from the type of the second-type cell group; and a processing unit, configured to process the RLF according to the type of the cell group corresponding to the PDU.

A fourth aspect provides a terminal device, which includes a processor, wherein the processor is configured to:

determine, when the number of retransmission times of a protocol data unit (PDU) of a radio link control (RLC) layer is greater than or equal to a maximum number of retransmission times and a radio link fault (RLF) is triggered, a type of a cell group corresponding to the PDU, the cell group corresponding to the PDU including a first-type cell group and/or a second-type cell group, and the type of the first-type cell group being different from the type of the second-type cell group; and process the RLF according to the type of the cell group corresponding to the PDU.

A fifth aspect provides a network device, which includes:

a generating unit, configured to generate configuration information, the configuration information being used for determining, by a terminal device, a type of a cell group corresponding to a protocol data unit (PDU), such that the terminal device processes a radio link fault (RLF) according to the type of the cell group corresponding to the PDU when the number of retransmission times of the PDU is greater than or equal to the maximum number of retransmission times and the RLF is triggered, wherein the cell group corresponding to the PDU includes a first-type cell group and a second-type cell group, and the type of the first-type cell group is different from the type of the second-type cell group; and a sending unit, configured to send the configuration information to the terminal device.

A sixth aspect provides a network device, which includes:

a processor, configured to generate configuration information, the configuration information being used for determining, by a terminal device, a type of a cell group corresponding to a protocol data unit (PDU), such that the terminal device processes a radio link fault (RLF) according to the type of the cell group corresponding to the PDU when the number of retransmission times of the PDU is greater than or equal to the maximum number of retransmission times and the RLF is triggered, wherein the cell group corresponding to the PDU includes a first-type cell group and a second-type cell group, and the type of the first-type cell group is different from the type of the second-type cell group; and a transceiver, configured to send the configuration information to the terminal device.

A seventh aspect provides a computer-readable medium configured to store a computer program including instructions for performing the method according to the first aspect or the second aspect.

An eighth aspect provides a computer chip, which includes: an input interface, an output interface, at least one processor, and a memory. The processor is configured to execute a code in the memory. When the code is executed, the processor may implement each process executed by the terminal device or the network device in the data transmission method according to the first aspect or the second aspect.

A ninth aspect provides a communication system, which includes the foregoing network device and the foregoing terminal device.

DETAILED DESCRIPTION

Technical solutions in the embodiments of the present disclosure will be described below with reference to the accompanying drawings.

It is to be understood that the technical solutions in the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a 5G communication system, a Long Term Evolution (LTE) system, an LTE Frequency Division Duplex (FDD) system, an LTE Time Division Duplex (TDD) system, and a Universal Mobile Telecommunication System (UMTS), etc.

The embodiments of the present disclosure are described with reference to a network device and a terminal device.

The network device may be a base station or a network side device having a base station function. For example, the network device may be a Base Transceiver Station (BTS) in a GSM system or a CDMA system, a NodeB (NB) in a WCDMA system, an Evolutional Node B (eNB or eNodeB) in an LTE system, or a wireless controller in Cloud Radio Access Network (CRAN), or a relay station, an access point, a vehicle-mounted device, a wearable device, and a network device in a future 5G network, etc.

The terminal device may also be referred to as an access terminal, user equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a SIP (Session Initiation Protocol) phone, a WLL (Wireless Local Loop) station, a PDA (Personal Digital Assistant), a handheld device having a wireless communication function, a computing device, or another linear processing device connected to a wireless modem, a vehicle-mounted device, and a wearable device, etc.

Based on New Radio (NR) technologies, in the DC scenario, an embodiment of the present disclosure provides a data transmission method, which may utilize a data duplication function of a packet data convergence protocol (PDCP) layer to implement data duplication transmission. The data transmission method provided by the embodiment of the present disclosure can effectively improve the reliability of data transmission.

The method for transmitting duplicated data in the DC scenario in the embodiment of the present disclosure will be briefly introduced below with reference to FIG. 1.

Figure 1:
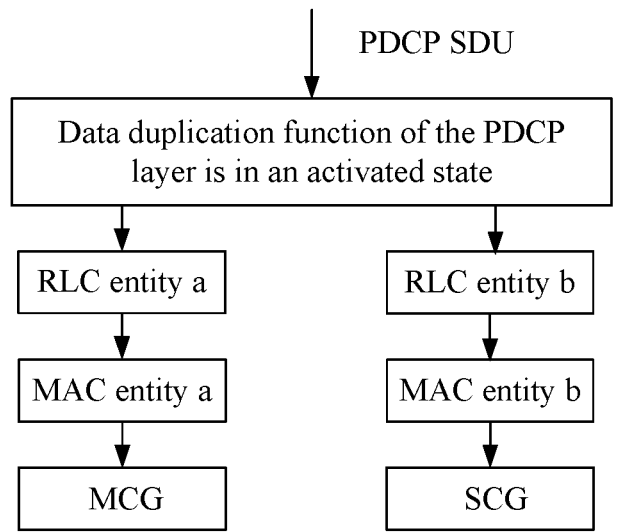
FIG. 1 is a schematic flowchart illustrating a data transmission method of a PDCP layer according to an embodiment of the present disclosure.

FIG. 1 is a schematic flowchart illustrating a data transmission method of a PDCP layer according to an embodiment of the present disclosure;

As shown in FIG. 1, data (PDCP PDU and duplicated PDCP PDU) generated by the PDCP layer are respectively transmitted to two different RLC entities (RLC entity a and RLC entity b), wherein the two different RLC entities respectively correspond to different Media Access Control (MAC) layer entities (MAC entity a and MAC entity b) mapped to different cell groups (MCG and SCG). In the embodiments of the present disclosure, the data (the PDCP PDU and the duplicated data of the PDCP PDU) generated by the PDCP layer are respectively mapped to different cell groups through two different RLC entities. In this way, the objective of frequency diversity gain can be achieved, and thus the reliability of data transmission can be improved.

Specifically, each sub-layer may send different data of the PDU to designated layers of a receiving terminal. Data not processed in each sub-layer are referred to as service data unit (SDU), and data processed by the sub-layer and formed into a specific format are referred to as protocol data unit (PDU). In other words, the SDU is an information unit transmitted from a higher-level protocol to a lower-level protocol, i.e., the original data of the SDU is the PDU of an upper-layer protocol. In other words, the PDU formed in this layer is the SDU of the next layer.

For example, each logical channel of each terminal device has one RLC entity, and data received by the RLC entity from the PDCP layer or data sent by the RLC entity to the PDCP layer may be referred to as RLC SDU (or PDCP PDU). Data received by the RLC entity from an MAC layer or data sent by the RLC entity to the MAC layer may be referred to as RLC PDU (or MAC SDU).

It is to be understood that in the embodiments of the present disclosure, the RLC layer is positioned between the PDCP layer and the MAC layer, and the RLC layer may communicate with the PDCP layer through a service access point (SAP), and communicate with the MAC layer through a logical channel. However, the embodiments of the present disclosure are not limited thereto.

However, using the data transmission method in the embodiments of the present disclosure, the terminal device may improve the reliability of data transmission by means of frequency diversity gain if neither the SCG nor the MCG fails, If the SCG and/or the MCG fails, it is also possible to cause failure of transmission data, and thus the success rate of data transmission is reduced. For example, when configuration data (DRB) or signaling (SRB) is only transmitted in the SCG, the transmission failure may be caused by fault of the SCG.

Therefore, further, an embodiment of the present disclosure also provides a data transmission method. With regard to a DC scenario, when the number of retransmission times of a PDU of an RLC layer is greater than or equal to a maximum number of retransmission times and a radio link fault (RLF) is triggered, a terminal device triggers different RLF operations through a transmission scenario of the PDU, which can effectively improve the success rate of transmitting uplink data.

It is to be understood that the RLF may be triggered by the number of retransmission times of the PDU of the RLC layer in the embodiments of the present disclosure. Specifically, a hybrid automatic repeat request (HARQ) mechanism of the MAC layer aims at implementing fast data retransmission, and the feedback error rate thereof is about 1%. However, for some services, the HARQ mechanism of a separate MAC layer cannot meet the transmission requirements. For example, TCP transmission requires that the packet loss rate is less than $10^{-5}$. Therefore, the feedback error rate may be further reduced by retransmission processing of the RLC layer.

However, to prevent the RLC layer from retransmitting data without restriction, a maximum number of retransmissions (maxRetxThreshold) is defined in the embodiments of the present disclosure. In other words, when the number of retransmission times of the PDU of the RLC layer is greater than or equal to the maximum number of retransmissions, the terminal device is triggered to perform an RLF operation.

Specifically, each AMD PDU that needs to be retransmitted (e.g., an RLC SDU transmitted for the first time or an RLC SDU retransmitted without segmentation) has an associated RETX_COUNT (count). When the sending terminal (an RRC layer) considers that if the AMD PDU is transmitted for the first time when the AMD PDU or AMD PDU segment needs to be retransmitted, the RETX_COUNT associated with the AMD PDU is set to 0. The RETX_COUNT is plus one if the AMD PDU is not transmitted for the first time and when the AMD PDU or AMD PDU segment has not yet been in the state of waiting for retransmission. The maximum number of retransmission times is reached if RETX_COUNT=maxRetxThreshold, and in this case, it is needed to inform the previous layer that the maximum number of retransmissions has been reached.

Figure 2:
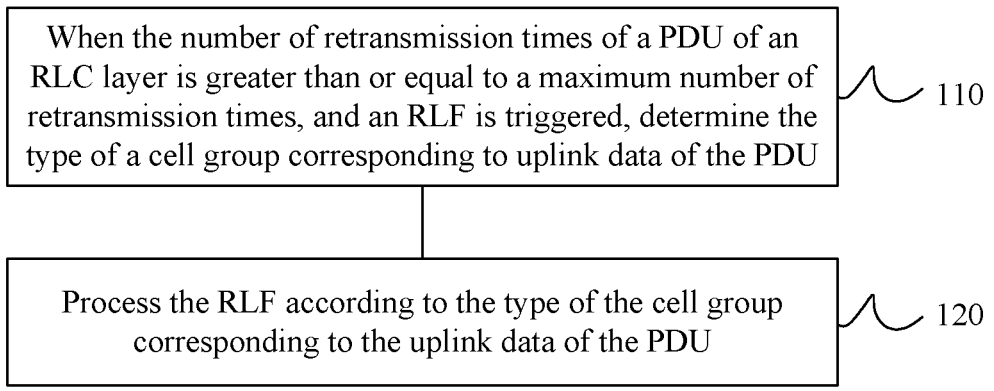
FIG. 2 is a schematic flowchart illustrating a data transmission method according to an embodiment of the present disclosure.

FIG. 2 is a schematic flowchart illustrating a data transmission method 100 according to an embodiment of the present disclosure.

As shown in FIG. 2, the method 100 includes:

110: determining, when the number of retransmission times of a protocol data unit (PDU) of a radio link control (RLC) layer is greater than or equal to a maximum number of retransmission times and a radio link fault (RLF) is triggered, a type of a cell group corresponding to the PDU uplink data; and 120: processing the RLF according to the type of the cell group corresponding to the PDU uplink data.

Specifically, the terminal device determines, when the number of retransmission times of a protocol data unit (PDU) of a radio link control (RLC) layer is greater than or equal to a maximum number of retransmission times and a radio link fault (RLF) is triggered, a type of a cell group corresponding to the PDU uplink data, wherein the cell group corresponding to the PDU includes a first-type cell group and/or a second-type cell group, and the type of the first-type cell group is different from the type of the second-type cell group. Next, the RLF is processed according to the type of the cell group corresponding to the PDU.

For ease of understanding, an exemplary description is made below by taking an example where the SCG serves as the first-type cell group and the MCG serves as the second-type cell group. However, it is to be understood that the embodiments of the present disclosure are not limited thereto. For example, the first-type cell group may also be any form of cell group corresponding to a physical layer carrier for transmitting signaling, and the second-type cell group may also be any form of cell group corresponding to a physical layer carrier for transmitting signaling and data.

It is to be noted that in the embodiments of the present disclosure, in the DC scenario, the RLF may be triggered by the maximum number of retransmissions occurring in the RLC layer of the master cell group (MCG) and in the RLC layer of the secondary cell group (SCG). In other words, the RLF may be triggered when the number of retransmission times of the PDU of the RLC entity corresponding to the MCG is greater than or equal to the maximum number of retransmissions; and the RLF may also be triggered when the number of retransmission times of the PDU of the RLC entity corresponding to the SCG is greater than or equal to the maximum number of retransmissions.

The cell groups in the embodiments of the present disclosure may correspond to the physical layer carriers one to one. In other words, the cell group corresponding to the PDU in the embodiments of the present disclosure may be interpreted as a cell group corresponding to the physical layer carrier for transmitting the PDU. For example, if the cell group corresponding to the PDU is an MCG, it may be understood that the cell group corresponding to the physical layer carrier for transmitting the PDU is the MCG.

Reference is made below to the method of processing the RLF by the terminal device when the number of retransmission times of the PDU of the RLC entity corresponding to the first-type cell group is greater than or equal to the maximum number of retransmission times and the RLF is triggered in different scenarios for the PDCP.

As an embodiment, when the number of retransmission times of the PDU is greater than or equal to the maximum number of retransmission times and the RLF is triggered, the data duplication function of the PDCP layer is in an activated state. In other words, the embodiments of the present disclosure are applicable to an SRB duplication scenario of a DC. Specifically, PDUs of different RLC entities correspond to different cell groups, and the number of retransmission times of the PDU of a certain AMD is greater than or equal to the maximum number of retransmissions.

Optionally, a radio resource control (RRC) connection of the first-type cell group is reconfigured if the cell group corresponding to the PDU is the first-type cell group. Specifically, the terminal device pends a signaling radio bearer (SRB) of the first-type cell group, and restores an SRB of the second-type cell group. Furthermore, the terminal device sends, on the SRB of the second-type cell group, RRC reconfiguration information of the first-type cell group to the network device. The RRC reconfiguration information may include failure information of the first-type cell group.

For example, it is assumed that the first-type cell group is an SCG, and the second-type cell group is an MCG. In this case, the terminal device reconfigures the RRC connection of the SCG when the number of retransmission times of the PDU of the RLC entity corresponding to the SCG is greater than or equal to the maximum number of retransmission times and the RLF is triggered. Specifically, the terminal device pends an SRB of the SCG, and restores an SRB of the MCG. Furthermore, the terminal device sends, on the SRB of the MCG, RRC reconfiguration information of the SCG to the network device. The RRC reconfiguration information may include failure information of the SCG.

Optionally, a radio resource control (RRC) connection of the second-type cell group is released or re-established if the cell group corresponding to the PDU is the second-type cell group.

For example, supposing the second-type cell group is the MCG, the terminal device releases or re-establishes the RRC connection of the MCG when the number of retransmission times of the PDU of the RLC entity corresponding to the MCG is greater than or equal to the maximum number of retransmission times and the RLF is triggered.

As another embodiment, when the number of retransmission times of the PDU is greater than or equal to the maximum number of retransmission times and the RLF is triggered, the data duplication function of the PDCP layer is in a closed state. In other words, the embodiments of the present disclosure are applicable to a DRB duplication scenario of a DC. Specifically, PDUs of different RLC entities correspond to different cell groups, and the number of retransmission times of the PDU of a certain AMD is greater than or equal to the maximum number of retransmissions.

Optionally, if the cell group corresponding to the PDU is the first-type cell group, the terminal device pends a data radio bearer (DRB) of the first-type cell group, and restores a DRB of the second-type cell group. Furthermore, the terminal device sends, on the DRB of the second-type cell group, the PDU to the network device. Optionally, the terminal device may also reconfigure a radio resource control (RRC) connection of the first-type cell group. Specifically, the terminal device may pend the SRB of the first-type cell group, and restore the SRB of the second-type cell group. Furthermore, the terminal device may send, on the SRB of the second-type cell group, RRC reconfiguration information of the first-type cell group to the network device.

For example, it is assumed that the first-type cell group is an SCG, and the second-type cell group is an MCG. In this case, when the number of retransmission times of the PDU of the RLC entity corresponding to the SCG is greater than or equal to the maximum number of retransmission times and the RLF is triggered, the terminal device may pend the DRB of the SCG, and restore the DRB of the MCG. Furthermore, the terminal device may send, on the DRB of the MCG, the PDU to the network device. Optionally, the terminal device may also reconfigure the RRC connection of the SCG. Specifically, the terminal device pends an SRB of the SCG, and restores an SRB of the MCG. Furthermore, the terminal device sends, on the SRB of the MCG, RRC reconfiguration information of the SCG to the network device. The RRC reconfiguration information may include failure information of the SCG.

In some embodiments of the present disclosure, optionally, a radio resource control (RRC) connection of the second-type cell group is released or re-established if the cell group corresponding to the PDU is the second-type cell group.

Specifically, in different scenarios for the PDCP, the terminal device may release or re-establish the RRC connection of the second-type cell group when the number of retransmission times of the PDU of the RLC entity corresponding to the second-type cell group is greater than or equal to the maximum number of retransmission times and the RLF is triggered.

For example, it is assumed that the second-type cell group is an MCG. No matter the data duplication function of the PDCP layer is in the activated state or the inactivated state, the terminal device may release or re-establish the RRC connection of the MCG when the number of retransmission times of the PDU of the RLC entity corresponding to the MCG is greater than or equal to the maximum number of retransmission times and the RLF is triggered. It is to be understood that the RRC connection release and the RRC connection re-establishment may be implemented by using the existing release method or re-establishment method, which is not specifically limited in the embodiments of the present disclosure.

In the embodiments of the present disclosure, optionally, before determining a type of a cell group corresponding to the PDU, the terminal device may also receive configuration information sent by a network device, wherein the configuration information is used for determining, by the terminal device, the type of the cell group corresponding to the PDU. Next, the terminal device determines the type of the cell group corresponding to the PDU according to the configuration information.

In other words, the network device sends, to the terminal device, the configuration information, which is used for determining, by the terminal device, the type of the cell group corresponding to the PDU, such that the terminal device processes a radio link fault (RLF) according to the type of the cell group corresponding to the PDU when the number of retransmission times of the PDU is greater than or equal to the maximum number of retransmission times and the RLF is triggered.

The cell group corresponding to the PDU includes a first-type cell group and a second-type cell group, wherein the type of the first-type cell group is different from the type of the second-type cell group.

Optionally, the terminal device receives a radio resource control (RRC) signaling sent by the network device, wherein the RRC signaling includes the configuration information. In other words, the network device sends a radio resource control (RRC) signaling to the terminal device, wherein the RRC signaling includes the configuration information.

Figure 3:
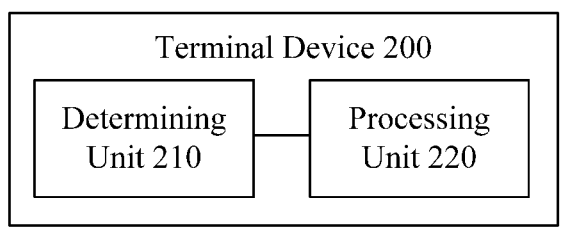
FIG. 3 is a block diagram illustrating a terminal device according to an embodiment of the present disclosure.

FIG. 3 is a block diagram illustrating a terminal device 200 according to an embodiment of the present disclosure.

As shown in FIG. 3, the terminal device 200 includes:

a determining unit 210, configured to determine, when the number of retransmission times of a protocol data unit (PDU) of a radio link control (RLC) layer is greater than or equal to a maximum number of retransmission times and a radio link fault (RLF) is triggered, a type of a cell group corresponding to the PDU, wherein the cell group corresponding to the PDU includes a first-type cell group and/or a second-type cell group, and the type of the first-type cell group is different from the type of the second-type cell group; and a processing unit 220, configured to process the RLF according to the type of the cell group corresponding to the PDU.

Optionally, when the number of retransmission times of the PDU is greater than or equal to the maximum number of retransmission times and the RLF is triggered, a data duplication function of a packet data convergence protocol (PDCP) layer is in an activated state.

Optionally, the processing unit 220 is specifically configured to:
reconfigure a radio resource control (RRC) connection of the first-type cell group if the cell group corresponding to the PDU is the first-type cell group.

Optionally, the processing unit 220 is more specifically configured to:
pend a signaling radio bearer (SRB) of the first-type cell group, and restore an SRB of the second-type cell group; and send, on the SRB of the second-type cell group, RRC reconfiguration information of the first-type cell group to the network device.

Optionally, when the number of retransmission times of the PDU is greater than or equal to the maximum number of retransmission times and the RLF is triggered, the data duplication function of the PDCP layer is in an inactivated state.

Optionally, the processing unit 220 is specifically configured to:
pend a data radio bearer (DRB) of the first-type cell group and restore a DRB of the second-type cell group if the cell group corresponding to the PDU is the first-type cell group; and send the PDU to a network device on the DRB of the second-type cell group.

Optionally, the processing unit 220 is further configured to:
reconfigure a radio resource control (RRC) connection of the first-type cell group.

Optionally, the processing unit 220 is specifically configured to:
pend a signaling radio bearer (SRB) of the first-type cell group, and restore an SRB of the second-type cell group; and send, on the SRB of the second-type cell group, RRC reconfiguration information of the first-type cell group to the network device.

Optionally, the processing unit 220 is specifically configured to:

release or re-establish a radio resource control (RRC) connection of the second-type cell group if the cell group corresponding to the PDU is the second-type cell group.

Optionally, the first-type cell group is a secondary cell group (SCG), and the second-type cell group is a master cell group (MCG).

Optionally, the terminal device further includes:

a receiving unit, configured to receive configuration information sent by a network device before determining a type of a cell group corresponding to the PDU, the configuration information being used for determining, by the terminal device, the type of the cell group corresponding to the PDU, wherein the determining unit 210 is specifically configured to:

determine the type of the cell group corresponding to the PDU according to the configuration information.

Optionally, the receiving unit is specifically configured to:

receive a radio resource control (RRC) signaling sent by the network device, wherein the RRC signaling includes the configuration information.

Figure 4:
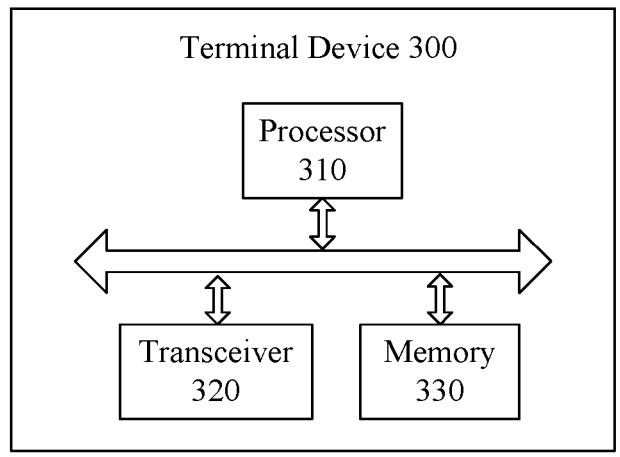
FIG. 4 is another block diagram illustrating a terminal device according to an embodiment of the present disclosure.

It is to be noted that in the embodiments of the present disclosure, the determining unit 210 and the processing unit 220 may be implemented by a processor, and the receiving unit may be implemented by a transceiver. As shown in FIG. 4, the terminal device 300 may include a processor 310, a transceiver 320, and a memory 330. The memory 330 may be configured to store indication information and also may be configured to store a code or an instruction executed by the processor 310, etc. Each component of the terminal device 300 is coupled through a bus system, wherein the bus system includes a data bus, and further includes a power bus, a control bus, and a status signal bus.

The terminal device 300 as shown in FIG. 4 can implement procedures implemented by the terminal device in the foregoing method embodiments in FIG. 1 and FIG. 2, and thus their detailed descriptions are omitted herein to avoid repetitions.

Figure 5:
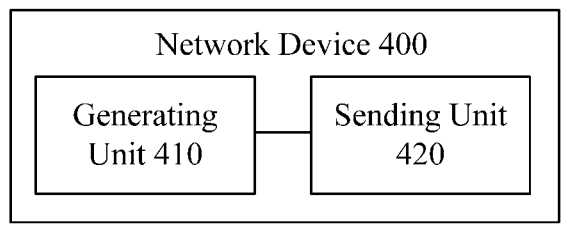
FIG. 5 is a block diagram illustrating a network device according to an embodiment of the present disclosure.

FIG. 5 is a block diagram illustrating a network device 400 according to an embodiment of the present disclosure. As shown in FIG. 5, the network device 400 includes:

a generating unit 410, configured to generate configuration information, the configuration information being used for determining, by a terminal device, a type of a cell group corresponding to a protocol data unit (PDU), such that the terminal device processes a radio link fault (RLF) according to the type of the cell group corresponding to the PDU when the number of retransmission times of the PDU is greater than or equal to the maximum number of retransmission times and the RLF is triggered, wherein the cell group corresponding to the PDU includes a first-type cell group and a second-type cell group, and the type of the first-type cell group is different from the type of the second-type cell group; and a sending unit 420, configured to send the configuration information to the terminal device.

Optionally, the sending unit 420 is specifically configured to:

send a radio resource control (RRC) signaling to the terminal device, wherein the RRC signaling includes the configuration information.

Figure 6:
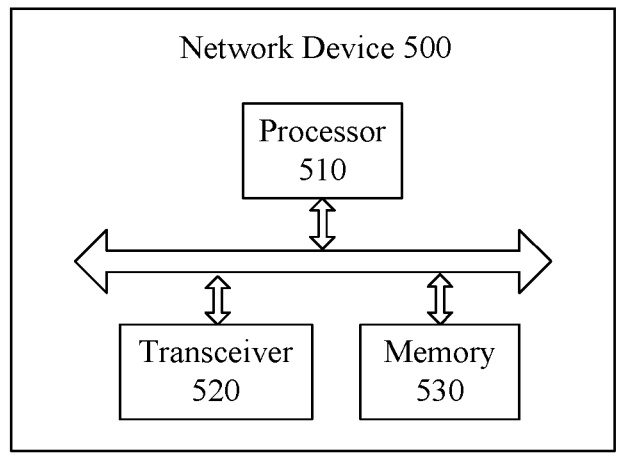
FIG. 6 is another block diagram illustrating a network device according to an embodiment of the present disclosure.

It is to be noted that in the embodiments of the present disclosure, the generating unit 410 may be implemented by a processor, and the sending unit 420 may be implemented by a transceiver. As shown in FIG. 6, the network device 500 may include a processor 510, a transceiver 520, and a memory 530. The memory 530 may be configured to store indication information and also may be configured to store a code or an instruction executed by the processor 510, etc. Each component of the network device 500 is coupled through a bus system, wherein the bus system includes a data bus, and further includes a power bus, a control bus, and a status signal bus.

The terminal device 500 as shown in FIG. 6 can implement procedures implemented by the network device in the foregoing method embodiments in FIG. 1 and FIG. 2, and thus their detailed descriptions are omitted herein to avoid repetitions.

It is to be noted that the method embodiments in the embodiments of the present disclosure may be applied to a processor, or may be implemented by the processor. The processor may be an integrated circuit chip and has a signal processing capability. In an implementation process, steps of the foregoing method embodiments may be implemented by using an integrated logic circuit of hardware in the processor or an instruction in a software form. The foregoing processor may be a general-purpose processor, a digital signal processor (DSP), an application-specific integrated circuit (ASIC), a field programmable gate array (FPGA) or another programmable logic device, a transistor logic device, or a discrete hardware component. The methods, steps, and logical block diagrams disclosed in the embodiments of the present disclosure may be implemented or executed. The general-purpose processor may be a microprocessor, or the processor may be any conventional processor or the like. The steps of the methods disclosed in the embodiments of the present disclosure may be directly executed by a hardware decoding processor, or may be executed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and implements the steps of the foregoing methods in combination with the hardware of the processor.

It can be understood that the memory in the embodiments of the present disclosure may be a volatile memory or a non-volatile memory, or may include both of a volatile memory and a non-volatile memory. The non-volatile memory may include: a read-only memory (ROM), a programmable ROM (PROM), an erasable PROM (EPROM), an electrically EPROM (EEPROM), or a flash memory. The volatile memory may be a random access memory (RAM), which is used as an external cache. According to description that can be used as an example but imposes no limitation, RAMs of many forms are applicable, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). It is to be noted that the memory in the system and the method described in this specification intends to include, but is not limited to, these memories and any other memory of a suitable type.

Finally, it is to be noted that terms used in the embodiments of the present disclosure and appended claims are only for the purpose of description of specific embodiments, and are not intended to limit the embodiments of the present disclosure.

For example, as used in the embodiments of the present disclosure and appended claims, the singular forms "a/an", "said" and "the" intend to also include the plural form, unless the content clearly dictates otherwise.

For another example, terms the first-type cell group and the second-type cell group may likely be used in the embodiments of the present disclosure, but these types of cell groups should not limited to these terms. These terms are only intended to distinguish among type cell groups.

For still another example, depending on the context, term "when" used herein can be interpreted as "if", "when", or "in response to determining" or "in response to detecting". Similarly, depending on the context, phrases "if determining" or "if detecting (stated condition or event)" can be interpreted as "when determining" or "in response to determining" or "when detecting (stated condition or event)" or "in response to detecting (stated condition or event)".

Persons of ordinary skill in the art may realize that it is possible to implement, by electronic hardware or a combination of computer software and electronic hardware, steps of units and methods in various examples as described in the embodiments disclosed herein. Whether these functions are executed in a hardware mode or a software mode depends on specific applications and design constraints on the technical solutions. Technical professionals may use different methods to implement functions as described in each of the specific applications. However, the implementation shall be not believed beyond the scope of the embodiments of the present disclosure.

Persons skilled in the art may clearly understand that for a convenient and concise description, a concrete work process of systems, apparatuses and units described above may refer to a corresponding process of the foregoing method embodiments, which is not repeated anymore herein.

From several embodiments provided in the application, it should be understood that the disclosed systems, apparatuses and methods may be implemented by means of other manners. For example, the apparatus embodiments described above are merely exemplary. For example, a unit partition is merely a logic functional partition. In actual implementation, additional manners of partitioning may be available. For another example, multiple units or components may be combined or integrated into another system, or some features may be ignored or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, i.e., either located at one place or distributed on a plurality of network units. Units may be selected in part or in whole according to actual needs to implement the objectives of the embodiments of the present disclosure.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solution of the embodiments of the present disclosure in essence or that part of contribution to the prior art or a part of the technical solution may be embodied in the form of software products, which may be stored in a storage medium, comprising some instructions to cause a computer device (a personal computer, a server or a network device and so on) to execute all or a part of steps of the method as recited in the embodiments of the present disclosure. The aforementioned storage medium includes: a USB flash disk, a mobile hard disk, a read only memory (ROM), a random access memory (RAM), a magnetic disk or an optical disk and other media capable of storing program codes.

The abovementioned embodiments are merely specific embodiments of the present disclosure, but the protection scope of the embodiments of the present disclosure is not limited thereto. Any variation or substitution easily conceivable to a person of ordinary skills in the art within the technical scope disclosed in the present disclosure shall fall into the protection scope of the embodiments of the present disclosure. Therefore, the protection scope of the embodiments of the present disclosure shall be subject to that of the claims.

What is claimed is:

1. A data transmission method, comprising:
   determining, when a number of retransmission times of a protocol data unit (PDU) of a radio link control (RLC) layer is greater than or equal to a maximum number of retransmission times and a radio link fault (RLF) is triggered, a type of a cell group corresponding to the PDU, the cell group corresponding to the PDU including at least one of a secondary cell group (SCG) and a master cell group (MCG);
   in response to determining that the cell group corresponding to the PDU is the MCG, releasing or re-establishing a radio resource control (RRC) connection of the MCG; and
   in response to determining that the cell group corresponding to the PDU is the SCG, determining whether a data duplication function of a packet data convergence protocol (PDCP) layer is in an activated state or an inactivated state;
   wherein in response to determining that the data duplication function is in the activated state, reconfiguring a RRC connection of the SCG; and
   wherein in response to determining that the data duplication function is in the inactivated state, pending a data radio bearer (DRB) of the SCG and restoring a DRB of the MCG, and sending the PDU to a network device on the DRB of the MCG.

2. The method according to claim 1, wherein reconfiguring the RRC connection of the SCG comprises:
   pending a signaling radio bearer (SRB) of the SCG, and restoring an SRB of the MCG; and
   sending, on the SRB of the MCG, RRC reconfiguration information of the SCG to the network device.

3. A terminal device, comprising a processor configured to:
   determine, when a number of retransmission times of a protocol data unit (PDU) of a radio link control (RLC) layer is greater than or equal to a maximum number of retransmission times and a radio link fault (RLF) is triggered, a type of a cell group corresponding to the PDU, the cell group corresponding to the PDU including at least one of a secondary cell group (SCG) and a master cell group (MCG); and in response to determining that the cell group corresponding to the PDU is the MCG, release or re-establish a radio resource control (RRC) connection of the MCG; and in response to determining that the cell group corresponding to the PDU is the SCG, determine whether a data duplication function of a packet data convergence protocol (PDCP) layer is in an activated state or an inactivated state;

wherein in response to determining that the data duplication function is in the activated state, reconfigure a RRC connection of the SCG; and wherein in response to determining that the data duplication function is in the inactivated state, pend a data radio bearer (DRB) of the SCG and restore a DRB of the MCG, and send the PDU to a network device on the DRB of the MCG.

4. The terminal device according to claim 3, wherein the processor configured to reconfigure the RRC connection of the SCG is configured to:

pend a signaling radio bearer (SRB) of the SCG, and restore an SRB of the MCG; and send, on the SRB of the MCG, RRC reconfiguration information of the SCG to the network device.

5. The terminal device according to claim 3, wherein in response to determining that the data duplication function is in the inactivated state, the processor is further configured to:

reconfigure the RRC connection of the SCG.

6. The terminal device according to claim 5, wherein the processor configured to reconfigure the RRC connection of the SCG is configured to:

pend a signaling radio bearer (SRB) of the SCG, and restore an SRB of the MCG; and send, on the SRB of the MCG, RRC reconfiguration information of the SCG to the network device.

7. The terminal device according to claim 3, further comprising:

a transceiver, configured to receive configuration information sent by the network device, the processor is configured to:

determine the type of the cell group corresponding to the PDU according to the configuration information.

8. The terminal device according to claim 7, wherein the transceiver is configured to:

receive a the RRC signaling sent by the network device, the RRC signaling including the configuration information.

* * * * *